G. E. PALMER.
TROLLEY.
APPLICATION FILED JAN. 14, 1911.
1,000,116.
Patented Aug. 8, 1911.
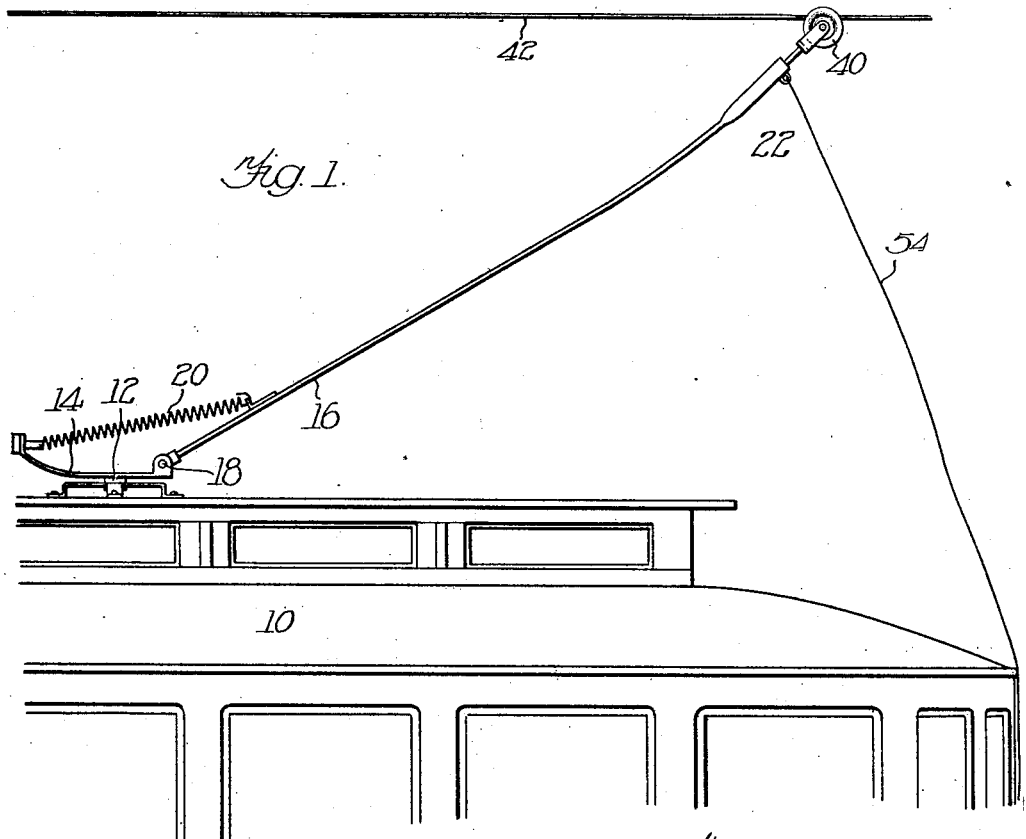
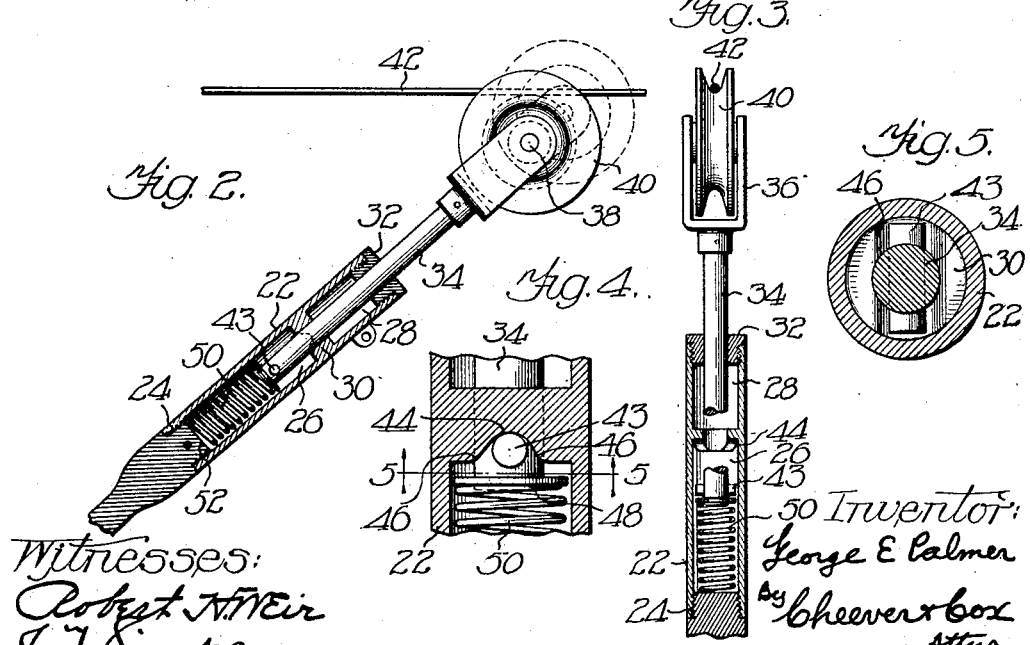
Witnesses:
Robert N. Weir
J. T. Simpson
Inventor:
George E. Palmer
By Cheever & Cox
Attys.

UNITED STATES PATENT OFFICE.

GEORGE E. PALMER, OF CHICAGO, ILLINOIS.

TROLLEY.

1,000,116.  Specification of Letters Patent.  Patented Aug. 8, 1911.

Application filed January 14, 1911. Serial No. 602,565.

*To all whom it may concern:*

Be it known that I, GEORGE E. PALMER, a citizen of the United States, residing at Chicago, in the county of Cook and State of Illinois, have invented a certain new and useful Improvement in Trolleys, of which the following is a specification.

This invention relates to trolleys of the ordinary type for use upon street cars propelled by electricity.

The object of the invention is to provide a mounting device for the trolley wheel on the end of the trolley pole proper which will be rigidly held in a given fixed plane, viz. that of the trolley wire and the longitudinal center of the car whenever the trolley wheel is off from the trolley wire but which will, when the wheel is brought in contact with the trolley wire, move to a position with reference to the trolley proper in which the trolley wheel may freely turn with reference to the trolley pole, thereby rendering it easy for the trolley wheel to pass around curves in the trolley wire.

The invention consists in a device which can be easily and cheaply made and installed, which will carry out the foregoing objects, and be efficient in operation and not liable to get out of order.

It consists more particularly in details of construction which will be more fully described and claimed as the specification proceeds.

In the drawings, Figure 1 is a side view of the upper portion of a street car, a trolley pole, a supporting device therefor, and the device of this invention applied to the end of the trolley pole. Fig. 2 is a vertical sectional detail view through the center of the upper end of the trolley pole, showing the device of this invention. Fig. 3 is a view corresponding to that of Fig. 2, but at right angles thereto. Fig. 4 is an enlarged detail view of the central portion of Fig. 2. Fig. 5 is an inverted plan view on the line 5—5 of Fig. 4.

Numeral 10 indicates the top of an ordinary street car having pivoted thereto at 12 a frame-work 14 adapted to swing in a horizontal plane, the trolley pole 16 of the ordinary type being pivoted thereto at 18 to swing in a vertical plane, and be controlled by the spring 20 in the ordinary manner.

At the upper end of the trolley pole 16 is an enlarged cylindrical end member 22 attached to the end of the trolley proper by the screw threads 24 or any other suitable means. This end member 22 is, as shown, hollow with the two chambered recesses 26 and 28 separated by the cross partition 30. The upper end of the trolley pole end 22 is closed by the cap 32. Slidably mounted through the partition 30 and the cap 32 is a cylindrical rod 34 carrying at its upper end a U shaped member 36, in which is journaled at 38 a trolley 40 adapted to bear against the underside of trolley wire 42 in the ordinary manner. In the lower end of rod 34 is a pin 43 adapted to rest, when the rod 34 is at the upward end of its stroke, in a notch or recess 44 in partition 30, the walls of the notch 44 being formed in a curved surface 46 so shaped that whenever this pin 43 strikes against the underside of partition 30 it will travel along said faces 46 and into the position shown in Fig. 4. At the extreme lower end of the rod 34 is a plate 48 engaged by a coil spring 50, which also engages against the end 52 of the trolley pole proper, with the result that the spring tends to force the pin 43 into engagement with the notch 44.

The result of the foregoing construction is that whenever the trolley wheel 40 is not in engagement with a trolley wire 42, the spring 50 forces the rod 34 and trolley wheel 40 upward until pin 43 is in engagement with notch 44, in which position rod 34, and consequently trolley wheel 40 cannot rotate about the axis of the rod 34, and it is therefore easy for the street car conductor to replace the trolley wheel in engagement with wire 42, using rope 54 in the ordinary manner. When, however, the trolley wheel 40 is in contact with a trolley wire, as 42, the action of the spring 20 forces the trolley pole 16 upward and consequently forces the trolley wheel 40 into engagement with the trolley wire with sufficient force so that pin 43 moves downward in recess 26 to somewhere near the position shown in Fig. 2, in which position pin 43 is out of engagement with notch 44, so that the rod 34, and consequently the trolley wheel, may rotate freely about the center of rod 34, thereby enabling the trolley wheel to follow a curved trolley wire without being in danger of slipping off, as would be the case if the trolley wheel could not rotate about the axis of the trolley pole.

The rendering the trolley wheel non-rotatable about the axis of the pole is very useful where the trolley passes across breaks in the trolley wire, as for instance at street intersections and in passing under viaducts, and the rendering it rotatable at other times greatly reduces friction and consequent expense present where a permanently fixed wheel is used.

The claim is:—

In a device of the class described, the combination of a trolley pole having upon its end a hollow tubular member divided between its ends by a partition provided with a notch and closed at its upper end by a detachable member, a trolley wheel carrying rod slidable through said detachable member and partition into the hollow space within said tubular member, a pin upon said rod below the partition adapted to detachably engage the notch in said partition, and a spring within said casing engaging said rod to move said rod to the position in which the pin engages the notch in the partition, for the purposes set forth.

In witness whereof, I have hereunto subscribed my name in the presence of two witnesses.

GEORGE E. PALMER.

Witnesses:
  DWIGHT B. CHEEVER,
  MAX S. ROSEWZWEIG.

---

Copies of this patent may be obtained for five cents each, by addressing the "Commissioner of Patents, Washington, D. C."